United States Patent
Wadehn et al.

(10) Patent No.: US 10,137,531 B2
(45) Date of Patent: Nov. 27, 2018

(54) METHODS AND SYSTEMS FOR SEPARATING AN EDGE PORTION OF A WORKPIECE USING A LASER

(71) Applicant: Trumpf Laser- und Systemtechnik GmbH, Ditzingen (DE)

(72) Inventors: Wolf Wadehn, Nussdorf (DE); Peter Demel, Stuttgart (DE); Markus Grill, Besigheim (DE); Ralf Kohlloeffel, Loechgau (DE); Tobias Hagenlocher, Ditzingen (DE); Ralf von Driesch, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 1341 days.

(21) Appl. No.: 13/953,255

(22) Filed: Jul. 29, 2013

(65) Prior Publication Data

US 2013/0313235 A1    Nov. 28, 2013

Related U.S. Application Data

(63) Continuation of application No. PCT/EP2012/000394, filed on Jan. 30, 2012.

(30) Foreign Application Priority Data

Jan. 31, 2011    (DE) .................. 10 2011 003 395

(51) Int. Cl.
    *B23K 26/14*    (2014.01)
    *B23K 26/40*    (2014.01)
    (Continued)

(52) U.S. Cl.
    CPC ............ *B23K 26/40* (2013.01); *B23K 26/032* (2013.01); *B23K 26/048* (2013.01); *B23K 26/0884* (2013.01); *B23K 26/361* (2015.10); *B23K 26/38* (2013.01); *B23K 2201/18* (2013.01); *B23K 2203/50* (2015.10)

(58) Field of Classification Search
    CPC ............ B23K 2201/18; B23K 2203/50; B23K 26/032; B23K 26/048; B23K 26/0884;
    (Continued)

(56) References Cited

U.S. PATENT DOCUMENTS

| | | | |
|---|---|---|---|
| 2009/0153868 A1* | 6/2009 | Sawabe ................ | B23K 26/032 356/445 |
| 2010/0122970 A1 | 5/2010 | Caristan | |
| 2010/0133243 A1* | 6/2010 | Nomaru ............... | B23K 26/032 219/121.67 |

FOREIGN PATENT DOCUMENTS

| | | |
|---|---|---|
| DE | 102004043076 A1 | 4/2005 |
| JP | 09001367 | 1/1997 |

(Continued)

OTHER PUBLICATIONS

Translation of JP2009113068.*
(Continued)

*Primary Examiner* — Dana Ross
*Assistant Examiner* — Joseph Iskra
(74) *Attorney, Agent, or Firm* — Fish & Richardson P.C.

(57) ABSTRACT

A method for cutting off an edge portion of a workpiece includes applying a laser to the workpiece to form multiple individual severing cuts in the edge portion such that the edge portion is cut off from the workpiece, the multiple individual severing cuts being arranged together along the edge portion. Applying the laser to the workpiece to form the multiple individual severing cuts includes, for each individual severing cut, translating a laser cutting head and/or the workpiece relative to one another, and detecting, at an end of each severing cut, an edge of the workpiece, in which the translation of the laser cutting head or the workpiece continues at least until the edge is detected.

9 Claims, 1 Drawing Sheet

(51) Int. Cl.
  *B23K 26/03* (2006.01)
  *B23K 26/04* (2014.01)
  *B23K 26/08* (2014.01)
  *B23K 26/38* (2014.01)
  *B23K 26/361* (2014.01)
  *B23K 101/18* (2006.01)
  *B23K 103/00* (2006.01)

(58) Field of Classification Search
  CPC ...... B23K 26/361; B23K 26/38; B23K 26/40;
  B23K 26/4005
  USPC .... 219/50, 68, 121.6, 121.8, 121.11, 121.18,
  219/121.39, 121.61, 121.67, 121.68,
  219/121.69, 121.72, 121.78, 121.79,
  219/121.82, 121.83, 121.85
  See application file for complete search history.

(56) References Cited

FOREIGN PATENT DOCUMENTS

| | | |
|---|---|---|
| JP | 09136174 | 5/1997 |
| JP | 09136174 A | 5/1997 |
| JP | 10146671 | 6/1998 |
| JP | 2009113068 A | 5/2009 |

OTHER PUBLICATIONS

Translation of JP9136174.*
International Preliminary Report on Patentability and Written Opinion from the corresponding PCT Application No. PCT/EP2012/000394, dated Aug. 6, 2013, 9 pages.
International Search Report from from corresponding PCT Application No. PCT/EP2012/000394, dated May 5, 2012, 6 pages.

* cited by examiner

METHODS AND SYSTEMS FOR SEPARATING AN EDGE PORTION OF A WORKPIECE USING A LASER

CROSS REFERENCE TO RELATED APPLICATIONS

This application is a continuation of and claims priority under 35 U.S.C. § 120 to PCT Application No. PCT/EP2012/000394 filed on Jan. 30, 2012, which claimed priority to German Application No. DE 10 2011 003 395.5 filed on Jan. 31, 2011. The contents of both of these priority applications are hereby incorporated by reference in their entirety.

TECHNICAL FIELD

The present disclosure relates to methods and systems for separating an edge portion of a workpiece using a laser.

BACKGROUND

In practice, workpieces, such as those obtained from sheet metal by forming, for example deep-drawn parts, often have undesired edge portions which have to be removed. Those edge portions, commonly referred to as "sheet skeleton," are usually separated from the workpiece as waste through the application of a laser to the workpiece, in which the laser is emitted from a laser cutting head. These edge portions are usually conveyed downwardly away from the workpiece. The resulting large contiguous edge portion often can only be removed from the workpiece with difficulty and/or may cause damage to the laser cutting apparatus given their weight. The large size and/or weight of the edge portions also may present problems during the handling of the removed edge portions during disposal or during recycling.

SUMMARY

The present disclosure is directed toward developing methods and systems for separating edge portions from workpieces so as to overcome the difficulties associated with removing, handling, and disposing of the edge portions and to make the separation of the edge portion from the workpiece efficient and reliable. Since the edge portion is generally irrelevant as far as the use of the workpiece is concerned, there are wide variations in the types of edge portions from piece to piece, depending on the process used.

An advantage of the methods set forth in the present disclosure is that an edge portion of the workpiece can be separated from the workpiece with less time being taken to do so and, at the same time, the edge portion can be divided into easily handled lengths. In addition, by separating the edge portion with a severing laser cut that is formed based on multiple individual severing cuts, it is possible to obtain a cut edge of high-quality, e.g., a cut edge with no or only small steps. Edge portions of unknown shape, geometry, or dimensions, especially width, can be cut off the workpiece without difficulty. By applying edge detection to detect a free edge of the edge portion, in which the edge detection is based on, for example, a measurement of the distance of the laser cutting head from the workpiece, each individual severing cut can be made exactly as far as at least the edge of the edge portion. Unnecessarily long cuts far beyond the edge of the workpiece can therefore be avoided, and the time needed to perform the cut can be reduced. In addition, the risk of a collision of the laser cutting head with the workpiece, e.g., with the edge portion to be separated (for which there may be no CAD data available for making a suitable cut), can be significantly reduced, such that damage to the laser cutting apparatus can be avoided. The methods disclosed herein also may be used to reliably avoid process tears or incomplete separation of the edge region or of individual lengths from the workpiece, making time-consuming and cost-intensive finishing of the workpiece unnecessary in some implementations.

The individual severing step may also continue beyond the edge of the edge region for a predefined distance. In that way, the risk of an incomplete individual severing cut in the region of the edge can be further reduced. The length of the distance, i.e., the size of such a safety margin, can be established based on a shape or size of the workpiece or also based on empirical values obtained in practice in respect of a distance dimensioned for optimum operation.

When executing the individual severing cut, a target end position of the laser cutting head relative to the workpiece is preferably specified in each case, in which the target end position is spaced further away from the laser severing cut than the edge of the edge portion. A relative movement of the laser cutting head and the workpiece as required for the execution of the individual severing cut can thereby be controlled in a precise and simple manner.

A particularly efficient, i.e. rapid and precise, separation of the edge portion can be achieved by moving the laser cutting head prior to the next individual severing and after execution of a previously executed individual severing cut to a start position that corresponds to a predetermined position of the laser cutting head corresponding to a processing position of the previously executed individual severing cut. The predetermined processing position may, in particular, correspond to a position at which the direction of an individual cut is changed from a direction along the laser severing cut to a cut made transversely to the laser severing cut and the direction of the edge of the edge portion. Overlapping individual severing cuts can thereby be avoided.

In some embodiments, coordinates of the predetermined processing position are temporarily stored in a data memory associated with the laser cutting apparatus and are used as position coordinates of the laser cutting head in the start position. As a result, the laser cutting head can be exactly positioned in the start position in a simple manner.

In some embodiments, information relating to control states of the laser cutting head at the predetermined processing position is temporarily stored and those control states of the laser cutting head are re-established in the start position by using the stored information. The control states may include an orientation of the laser cutting head relative to the workpiece and a cutting power of a laser cutting beam of the laser cutting head. In that way, it is possible to compensate for changes in the control states of the laser cutting head that may have changed after movement of the laser cutting head, so as to produce a cut edge of the laser severing cut with a particularly high quality.

The laser cutting head is preferably moved to the start position with the laser cutting beam deactivated and without performing edge detection, for example, without measurement of the laser cutting head distance from the workpiece surface. With the laser cutting beam deactivated, it is possible to avoid potential damage to the workpiece. In the case of the deactivated distance measurement, a higher displacement movement of the laser cutting head can be achieved.

In some embodiments, the danger of a collision of the laser cutting head with the workpiece can be reduced by moving the laser cutting head being after an individual severing cut to the start position of the next individual severing cut along a defined movement path.

The movement path is preferably curved relative to the surface of the workpiece, so that the laser cutting head can be moved at a suitable safe distance from the workpiece. Such a movement path can also be provided in the case of a different relative movement of the laser cutting head and the workpiece for positioning of the laser cutting head in the start position.

For rapid positioning of the laser cutting head in the start position, the movement path can be further optimized by defining the movement path by means of measured distance data, in which the measured distance data is obtained during a previously executed individual severing cut as the distance of the laser cutting head from the surface of the workpiece is monitored. In that manner, rigidly predefined and possibly unnecessarily long displacement distances may be avoided.

Preferably, the laser light or process light reflected at the workpiece or the distance between laser cutting head and workpiece is measured for the purpose of edge detection.

The present disclosure also relates to a laser cutting apparatus suitable for carrying out the methods described herein.

Further advantages will be apparent from the description, the claims and the drawings. The features mentioned above and the features set forth hereinafter may also be used individually or they may be used in any desired combination. The embodiment shown and described is not to be understood as forming an exhaustive list, but rather is of the nature of an example for illustrating the invention. The drawings show the subject-matter in a highly schematic form and are not to be understood as being to scale.

DETAILED DESCRIPTION

Figure 1:
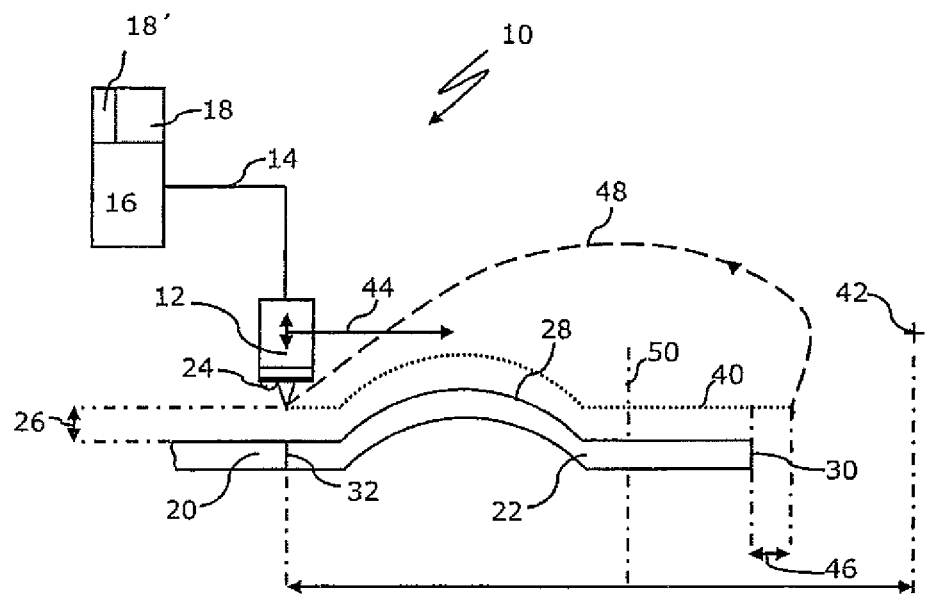
FIG. 1 is a schematic that shows a side view of a laser cutting apparatus having a laser cutting head positioned over a workpiece.

FIG. 1 is a schematic that shows a side view of a laser cutting apparatus 10. The laser cutting apparatus has a multi-axially movable laser cutting head 12 which is connected to a control device 16 via a control line 14. The control device 16 has a data memory 18 with a temporary memory 18'. The laser cutting head 12 is positioned in the present case above a workpiece 20, which is in the form of a deep-drawn part having an edge portion 22, and has a non-contact distance measuring device (distance sensor) 24 for measuring its distance 26 from the workpiece 20. The edge portion 22 of the workpiece 20 has a bulge 28 facing upwards in FIG. 1 and has a free edge 30.

The control device 16 is programmed to perform the method described hereinafter for cutting off the edge portion 22 of the workpiece 20 by means of a laser severing cut 32 executed by the laser cutting head 12.

Figure 2:
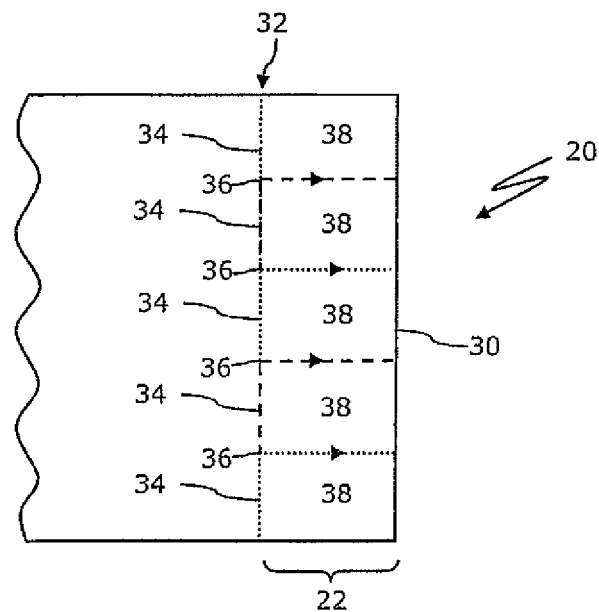
FIG. 2 is a schematic that shows a plan view of the edge region of the workpiece shown in FIG. 1, in which the edge region is to be cut off by applying a laser to the workpiece to form multiple individual severing cuts that are arranged together in a line.

As shown in FIG. 2, the edge portion 22 is separated using a laser severing cut 32 which, in the case of the workpiece 20 under consideration, extends substantially parallel to the free edge 30 of the workpiece 20. The course of the laser severing cut 32 is specified by means of CAD data stored in the data memory 18, in which the CAD data defines a predetermined contour of the workpiece 20. If no CAD data is available regarding the contour, e.g., from deep drawn workpieces, then the drawing edge can alternatively be recorded based on a measurement directly from a specimen component.

The laser severing cut 32 is formed by a plurality of individual severing cuts 34 strung together (e.g., five in the example shown in FIG. 2), each individual severing cut 34 including a measurement of the distance 26 between laser cutting head 12 and workpiece 20 while the laser cutting head moves in the direction of the edge 30 of the edge portion 22, before the respective next individual severing cut 34 is executed. Each individual severing cut 34 includes making a cut along the laser severing cut 32 and then transversely to the laser severing cut 32 that is to be formed, in this case at an angle of 90 degrees, in the direction of the edge 30, as illustrated by the arrowheads overlaying the broken lines within the edge portion 22 in FIG. 2. The same procedure can also be used to separate the last area 38; in that case the separating edge lies in the direction of the laser severing cut 32.

At the positions of the individual severing cuts 34 marked by 36 in each case, the respective position coordinates and operating parameters of the laser cutting head 12 associated with the positions 36 are temporarily stored in the temporary memory 18' of the data memory 18 of the control device 16. As will be described below, the position coordinates and operating parameters are used to establish the start point for the next individual severing cut 34.

Before the respective next individual severing cut 34 is executed, the individual severing cuts 34 are continued from positions 36 in the direction of the edge 30 of the edge portion 22 at least until the edge 30 is detected on the basis of the distance measurement. In that manner, individual areas 38 of the edge portion 22 are cut off the workpiece 20 one after another.

Measured distance values obtained in the distance measurements are used to regulate the distance 26 of the laser cutting head 12 to a predefined setpoint distance value. When executing the individual severing cuts 34, the laser cutting head 12 moves past respective surface contours of the workpiece 20, such as the bulge 28 reproduced here as part of the edge portion 22 (see FIG. 1), along the displacement path 40 shown as a broken line.

The distance measuring device 24 ascertains the distance values while the individual severing cut 34 is being made in the direction towards the edge 30, that is, transversely to the laser severing cut 32, and preferably stores the distance values temporarily in the temporary memory 18' of the data memory 18.

The length of each individual severing cut 34 is limited by specifying a target end position 42 of the laser cutting head 12 in the principal movement direction 44 when the individual severing cut is being made in the direction of the edge 30. The target end position 42 is selected so that, in any event in the principal movement direction 44, the target end position 42 is spaced further away from the laser severing cut 32 than is the edge 30 of the edge portion 22.

In the example embodiment shown in FIGS. 1 and 2, after the edge 30 has been detected based on the distance measurement, the laser remains on while the laser cutting head moves beyond the edge 30 of the edge portion 22 for a predefined distance 46 to ensure with an even greater degree of certainty that the lengths 38 are cut off completely or to avoid collisions between the laser cutting head and the edge portion 22 that has been cut off, for example, if the edge portion 22 slips out of place after being cut off.

As soon as the individual severing cut 34 has been concluded upon reaching the predefined distance 46, the laser beam (not shown) of the laser cutting head 12 executing the individual severing cut 34 and the distance measuring device 24 of the laser cutting head 12 are deactivated.

The laser cutting head 12 is then moved to a defined start position for the next individual severing cut 34, in which the defined start position corresponds to the processing position 36 of the previously executed individual severing cut 34, where the laser cutting head 12 changed direction from proceeding along cut 32 (parallel to the edge 30) to proceeding towards the edge 30.

To position the cutting head 12 in the start position, the position coordinates of the laser cutting head 12 that have been temporarily stored in the temporary memory 18' of the data memory 18 are used as position coordinates of the start position.

The laser cutting head 12 is moved to the start position along a defined movement path 48. The movement path 48 is preferably defined by means of the measured distance values stored in the temporary memory 18' of the data memory 18, in which the measured distance values are obtained by the distance measuring device 24 during the previously executed individual severing cut 34. In the present case, the movement path 48 is curved relative to the workpiece 20 and extends at such a distance from the workpiece 20 that collision of the laser cutting head 12 with the bulge 28 of the workpiece 20 is reliably avoided.

In the start position of the next severing cut 34, the control states of the laser cutting head 12 in the processing position 36 of the respective individual severing cut executed previously, which have been stored in the temporary memory 18' of the data memory 18, are re-established and then the next individual severing cut 34 is executed as described above. The edge portion 22 is completely separated from the workpiece 20 by a last severing cut of the plurality of individual severing cuts 34.

Preferably, re-activation of the laser beam does not take place directly in the processing position 36 but close to it. Additionally, to avoid incipient melting, re-activation does not take place in a position on or over the workpiece 20. Once re-activated, the laser cutting head 12 then travels to the processing position 36 and continues its operation there at the customary pace. The laser beam is therefore returned to the desired path in such a manner that no contour damage occurs after separation of the edge portion.

To prevent an edge situated in the edge portion 22 from being erroneously interpreted as the edge 30, edge detection is activated by the control device 16 only when the individual cut 34 or the laser cutting head 12 has reached a predetermined distance from the laser severing cut 32 in the principal movement direction 44, that is to say, in FIG. 1, only when the line 50 has been passed.

Instead of the described distance between laser cutting head 12 and workpiece 20, the laser light or process light reflected at the workpiece 20 can be measured by suitable sensors for the purpose of edge detection.

A number of embodiments of the invention have been described. Nevertheless, it will be understood that various modifications may be made without departing from the spirit and scope of the invention. Accordingly, other embodiments are within the scope of the following claims.

What is claimed is:

1. A method for cutting off an edge portion of a workpiece, the method comprising:

applying a laser to the workpiece to form at least a plurality of individual severing cuts in the edge portion such that the edge portion is cut off from the workpiece, the plurality of individual severing cuts being arranged together along the edge portion, wherein applying the laser to the workpiece to form the plurality of individual severing cuts comprises, for each individual severing cut of the plurality of individual severing cuts:

translating a laser cutting head and/or the workpiece relative to one another to form a first portion of the individual severing cut extending along a first direction;

altering a translation direction of the laser cutting head and/or the workpiece to form a second portion of the individual severing cut extending along a second different direction toward the edge of the workpiece;

detecting, at an end of the individual severing cut, an edge of the workpiece, wherein the translation of the laser cutting head or the workpiece continues at least until the edge is detected; and after detecting the edge of the workpiece, translating the laser cutting head and/or workpiece relative to one another to a start position for a next individual severing cut, wherein the start position of the next individual severing cut occurs at a position on the workpiece where the individual severing cut changes from extending along the first direction to extending along the second direction.

2. A method according to claim 1, wherein, for each individual severing cut, the translation of the laser cutting head or the workpiece relative to one another continues for a predefined distance after the edge of the workpiece is detected.

3. A method according to claim 1, wherein position coordinates of the predetermined processing position and/or information relating to control states of the laser cutting head in the predetermined processing position are stored in temporary memory.

4. A method according to claim 3, wherein the information relating to the control states of the laser cutting head is used to re-establish the control states in the start position of the next individual severing cut.

5. A method according to claim 1, wherein applying the laser to the workpiece comprises moving the laser cutting head and/or the workpiece relative to one another along a defined movement path after forming the first individual severing cut, such that the laser cutting head is located at a start position of the next individual severing cut.

6. A method according to claim 5, further comprising measuring distance values during the formation of the first individual severing cut, wherein each of the distance values corresponds to a distance between the laser cutting head and the workpiece, and wherein the movement path is defined by the measured distance values.

7. A method according to claim 1, wherein during the translation of the laser cutting head or the workpiece after the formation of the first individual severing cut and before starting the next individual severing cut, the laser of the laser cutting head is deactivated.

8. A method according to claim 1, wherein detecting the edge of the workpiece comprises activating an edge detection sensor during formation of the second portion and after the laser reaches a predetermined distance from the first portion.

9. A method according to claim 1, wherein detecting the edge of the workpiece comprises measuring laser light reflected from the workpiece, measuring light generated by the laser cutting, or measuring a distance between a laser cutting head and the workpiece.

\* \* \* \* \*